United States Patent
Kao et al.

(10) Patent No.: US 7,350,962 B2
(45) Date of Patent: Apr. 1, 2008

(54) LIQUID RECYCLE INLET DISTRIBUTOR ASSEMBLY

(75) Inventors: Thomas Kao, Vorhees, NJ (US); Robert Chang, West Windsor, NJ (US)

(73) Assignee: Hydrocarbon Technologies Innovation Group, Inc., Lawrenceville, NJ (US)

( * ) Notice: Subject to any disclaimer, the term of this patent is extended or adjusted under 35 U.S.C. 154(b) by 603 days.

(21) Appl. No.: 11/044,690

(22) Filed: Jan. 27, 2005

(65) Prior Publication Data
US 2005/0129595 A1    Jun. 16, 2005

Related U.S. Application Data

(62) Division of application No. 10/225,937, filed on Aug. 22, 2002, now Pat. No. 6,960,325.

(51) Int. Cl.
*B01F 5/04*    (2006.01)

(52) U.S. Cl. .................. 366/165.2; 366/175.2; 422/220

(58) Field of Classification Search ........ 366/136–137, 366/167.1, 173.1, 173.2, 174.1, 175.2, 181.6, 366/134, 165.1, 165.2; 239/127, 142; 137/590, 137/808–813; 422/215, 220, 224
See application file for complete search history.

(56) References Cited

U.S. PATENT DOCUMENTS

| | | | |
|---|---|---|---|
| 1,087,242 A * | 2/1914 | Kelly | ............... 137/592 |
| 1,776,032 A | 9/1930 | Kobernik | |
| 3,519,555 A | 7/1970 | Keith et al. | |
| 3,769,198 A | 10/1973 | Johanson et al. | |
| 4,394,966 A * | 7/1983 | Snyder et al. | ............... 239/127 |
| 4,400,263 A | 8/1983 | Kydd et al. | |
| 4,526,676 A | 7/1985 | Seufert | |
| 4,702,891 A | 10/1987 | Li et al. | |
| 4,764,347 A | 8/1988 | Milligan | |
| 5,066,467 A | 11/1991 | Chan | |
| 5,356,213 A * | 10/1994 | Arpentinier | ............... 366/165.1 |
| 5,723,041 A * | 3/1998 | Devanathan et al. | ........ 208/158 |
| 6,190,542 B1 | 2/2001 | Comolli et al. | |
| 6,265,451 B1 | 7/2001 | Zhou et al. | |
| 6,277,895 B1 | 8/2001 | Zhou et al. | |
| 6,854,874 B2 * | 2/2005 | Graham, Sr. | ............... 366/173.1 |
| 6,960,325 B2 * | 11/2005 | Kao et al. | ............... 422/145 |

FOREIGN PATENT DOCUMENTS

WO        03/053559 A1 *   7/2003

* cited by examiner

*Primary Examiner*—Charles E. Cooley
(74) *Attorney, Agent, or Firm*—Workman Nydegger

(57) ABSTRACT

A catalytic hydrocracking reactor vessel includes enhanced components for the conversion of a hydrogen gas and fossil fuel feedstream to light liquid hydrocarbons. The reactor vessel comprises one or more of a reactor cup riser with a helical cyclonic separator conduit for separating a liquid and vapor product stream to provide an essentially vapor-free liquid recycle stream; a grid plate bubble cap with wall housing having serrated edges for producing small hydrogen bubbles of increased total surface area of bubbles at lower pressure drop; a feedstream inlet pipe sparger containing rows of downward directed slots for even distribution of the feedstream across the cross-sectional area of the reactor and providing free drain of solid particles from the sparger; and optionally a liquid recycle inlet distributor containing vertically curved plates for creating a whirling motion in the liquid recycle stream for better mixing with the feedstream with minimal solids settling.

20 Claims, 5 Drawing Sheets

H2 and Oil/Slurry Feed Inlet

LIQUID RECYCLE INLET DISTRIBUTOR ASSEMBLY

CROSS-REFERENCE TO RELATED APPLICATIONS

This application is a division of U.S. application Ser. No. 10/225,937, filed Aug. 22, 2002, now U.S. Pat. No. 6,960,325 B2, the disclosure of which is incorporated herein in its entirety.

BACKGROUND OF THE INVENTION

1. The Field of the Invention

This invention relates to an apparatus for converting coal, petroleum residue, tar sands and similar materials to hydrocarbon liquids or gases. The invention particularly relates to an advantageous reactor design that overcomes several reactor-associated performance problems and improves the overall efficiency of the conversion steps occurring in the reactor, particularly the catalytic hydrogenation and/or hydrocrackng of coal particles into hydrocarbon liquids in catalytic slurry reactors.

2. The Relevant Technology

The conversion of fossil fuels such as coal, natural gas and peat to liquid hydrocarbon fuels and/or chemicals has been the subject of intensive research and development throughout the industrialized world for many years to provide a practical alternative to petroleum crude oil production and open-up the world's vast reserves of coal as a competitive source for essential hydrocarbons. Many processes have been developed for the direct or indirect catalytic hydrogenation of fossil fuels to yield liquid hydrocarbons; some large pilot plants have been built and operated, and about twenty commercial scale plants have been built for the conversion of coal to primarily liquid hydrocarbons. Of these twenty plants, most were built by the German government during World War II. They were built using the well-known Fischer-Tropsch (F-T) process for converting synthesis gas to liquid hydrocarbons in contact with iron catalyst and, operationally at least, worked well enough for war-time needs. Subsequently, the South African Government (SASOL) built two commercial-sized coal conversion plants to produce hydrocarbon fuels and chemicals which also were successfully based on indirect conversion using Fischer-Tropsch chemistry and iron catalysis. Both the German and SASOL projects were driven by political necessity but were otherwise commercially uncompetitive with crude oil discovery and production.

The F-T process is a known method for preparing liquid hydrocarbons from fossil fuels, especially coal, by conversion of coal to synthesis gas, i.e., a mixture of carbon monoxide and hydrogen, followed by conversion to liquid hydrocarbons over a precipitated iron F-T catalyst. However, precipitated iron catalysts in the F-T process are especially fragile and break down easily under conventional reaction conditions into very fine particles which are carried over into the hydrocarbon liquid products. U.S. Pat. Nos. 6,265,451 and 6,277,895, assigned to Hydrocarbon Technologies, Inc., and incorporated herein by reference in their entirety, teach skeletal iron F-T catalysts for the production of liquid hydrocarbons from fossil fuel derived synthesis gas in a slurry reactor. The patents teach and claim a relatively simple and inexpensive method for preparing the skeletal iron F-T catalyst that experiences less attrition and the conversion of syngas is higher than that obtained by using fused iron as catalyst. Also, the conversion of the feed is equivalent to that achieved by precipitated iron F-T catalyst. The catalyst is recycled in the process.

U.S. Pat. No. 6,190,542, also assigned to Hydrocarbon Technologies, Inc., teaches a multi-stage direct catalytic hydrogenation and hydroconversion process for the conversion of fossil fuels such as coal over iron catalysts to low boiling hydrocarbon liquid products. The first stage of the hydroconversion and hydrogenation process utilizes a back-mixed reactor.

A catalytic reactor system that has been successfully used to directly convert coal or heavy hydrocarbon feedstock such as residuum and oils from tar sands into lighter hydrocarbon liquids is the ebullating bed reactor. In this reactor, upward flowing streams of coal fines, liquid and gaseous materials such as oil and hydrogen flow upward through a vessel containing a mass of solid catalyst particles. The mass of particles expand by at least 10% and are placed thereby in random motion within the vessel. The characteristics of the ebullated mass are such that a finer, lighter solid will pass upwardly through the mass of catalyst particles such the ebullated mass is retained in the reactor, and the finer, lighter material may pass from the reactor along with the lighter hydrocarbon liquid products. An exemplary ebullated bed reactor is described in U.S. Pat. Nos. 3,519,555 and 3,769,198 and is well known to those skilled in the art of petroleum residuum upgrading and coal conversion. It is employed in the H-Coal process as described in U.S. Pat. No. 4,400,263 and in the H-Oil process for the hydrotreating of residuum as described in U.S. Pat. No. 4,526,676. It can also be employed in the more advanced hydroconversion process, i.e., the catalytic multi-stage process, for the conversion and refining of a hydrocarbon feed as described in U.S. Pat. No. 6,190,542 where the catalyst is a dispersed catalyst and the catalyst is integral part of the feed to the reactor. The catalytic slurry bed reactor apparatus for coal or residuum conversion is typically operated at high hydrogen partial pressure between 2,000 and 3,500 psi at a reactor temperature between 700° F. and 850° F.

Processes dedicated to the hydrogenation and hydroconversion of seemingly intractable materials, such as coal and petroleum residuum, are routinely faced with the challenge of designing an apparatus that can contain catalytic particles at high pressures and temperature while converting an evenly distributed feed stream of hydrogen feed gas, hydrocarbon liquid and vapor and reactant particles; a liquid recycle stream of converted mixtures preferably must be made essentially free of vapor and pumped back to the reactor as a recycle feedstream; and a recycle flow return pump must assure that an even distribution of the recycle stream occurs across the bottom plenum of the reactor to avoid settling and coking of unreacted coal particles. Conventionally, and to a greater or lesser degree, these problems are overcome in the prior art by introducing the feedstream through a sparger and distribution plate which favors an even distribution of reactants across the reactor and using a reactor cup riser for liquid/vapor separation in the reactor. Improvements in the recycle return pump design and performance are also regularly sought.

The inventions described herein are directed to overcoming these and other problems encountered in apparatuses dedication to the hydroconversion of coal and/or heavy oil to produce lighter and more valuable hydrocarbon liquids.

SUMMARY OF THE INVENTION

An apparatus is disclosed for the conversion of coal particles or heavy petroleum liquids such as residuum or tar sands into light petroleum liquids in contact with hydrogen and catalyst particles. The apparatus comprises a cylindrical, high pressure reactor vessel for containing preferably a mixture of catalyst particles in a slurry of coal and/or oil and hydrogen gas. A conduit means is connected through the bottom head location of the reactor to introduce hydrogen gas and feedstock such as heavy oil or an oil-slurry of fine coal particles. Fine catalyst particles may also be introduced as a component of the slurry of feedstock. A conduit means is also connected to the reactor through a reactor top head location to remove hydrocarbon liquid and vapor product and hydrogen gas.

The catalytic slurry particles in the reactor vessel are supported within the reactor by a perforated, circular grid plate, the circumference of which is in contact with the inner wall of the vessel and connected thereto. Bubble cap means, in communication with the non-dissolvable, hydrogen rich vapor layer underneath the grid plate, are connected through the perforations of the grid plate to receive and distribute vapor/liquid feedstreams as fine bubbles flowing upward evenly across the entire cross-sectional area of the reactor.

A sparger means is contained in the bottom plenum of the reactor vessel below the grid plate location but above the outlet of the feedstream conduit means. The sparger receives the feedstock stream of hydrogen and oil or coal/oil/catalyst slurry and distributes the stream evenly across the cross-sectional area of the vessel below the grid plate.

A means for collecting a liquid recycle flow stream is provided in a top head part of the reactor vessel below the conduit means that is used to remove hydrocarbon product vapor. The collecting means preferably comprises a funnel or cup having a conical wall sloping downward from a circular wide mouth in contact with the reactor vessel inner wall to a narrow mouth outlet. A cup riser means for separating liquid and vapor is connected to the funnel inner wall in open communication with the space below the funnel and over the catalytic slurry.

A conduit downcomer means for transporting a liquid recycle stream to the reactor is connected to the funnel outlet. The liquid recycle stream is collected from the funnel with the downcomer conduit exiting through the reactor wall at a bottom head location thereof from which the liquid recycle is pumped by a liquid circulating pump through a recycle flow return conduit entering through the bottom head of the reactor wall below the sparger and grid plate.

The terminus of the pumped recycle flow return conduit contained within the bottom head of the vessel contains a reactor circulating pump inlet distribution means affixed thereto for receiving the pumped recycle liquid stream and mixing the recycle stream with the feedstock of oil, coal particles, hydrogen and catalyst particles, provided dispersed catalyst is included in the process feedstock of the inlet feedsteam.

The reactor circulating pump distribution means is capped on top so that the pumped recycle liquid flow entering the distribution means is required to exit the distribution means horizontally. The recycle distribution means contains several, i.e., 1-3, separated, essentially parallel horizontal circular plate rings having both an outer ring circumference in contact with a containment means or with the recycle flow return conduit and an inner circumference describing an open passage way for admission of pumped recycle liquid. Attached to each of the circular plate rings is a series of separated, vertical fins or plates similarly curved in the same direction such that the outer edges of the fins and the outer circumferential edge of the horizontal plates together describe an opening or exit window.

The configuration of the reactor circulating pump distribution means serves to create a whirlpool effect in the bottom head of the reactor as recycle liquid is pumped though the distribution means. The whirlpool effect itself causes coal particles that may be deposited on the bottom of the reactor to become resuspended in the feed stream and so avoid solid settling and coking. Also, a better mixing of liquid and hydrogen from the feed is achieved.

The bubble cap means that is positioned and affixed on the grid. plate through perforations therein consists of a double pipe riser, i.e., an outer and inner pipe or shell-in-shell, supporting the bubble cap itself. The double pipe riser passes through the grid plate perforations. The inner pipe contains slotted openings in the top wall of the pipe and supports a tapered, generally round or cylindrical bell cap of trapezoidal vertical cross-section by contact with the minor, interior top surface of the bell cap. The bubble cap bottom is open with the major lower circumferential edge or open bottom edge of the bell cap notched or serrated into saw-tooth triangles. The inner pipe slot openings are in communication with the interior space of the bell cap. The outer pipe is closed at the top below the inner pipe slot openings and also contains slotted openings at the top end of the pipe, which openings are also in communication with the interior space of the bubble cap. The bottom edge of the outside pipe is also serrated and terminates in the vapor space immediately below the grid plate. The bottom edge of the inside pipe terminates at the interface of the liquid and vapor layer below the grid plate and also below the intervening vapor layer.

The tapered bubble cap of the invention with the serrated edges produces much smaller bubbles over prior art bubble caps and, therefore, a greater total hydrogen bubble surface area which provides an accelerated mass transfer. The tapered bubble cap also results in less pressure drop as there is no need to change the direction of the flow of the exiting gas as experienced by non-tapered bubble caps. The double pipe shell-in-shell also eliminates the vibration or pulsation problems experienced in the prior art reactors containing single pipe bubble caps.

The sparger included in the apparatus of the instant inventions comprises one ring of conduit piping. The sparger is supported by attachments to the bottom of the grid plate and is connected to and in communication with the feed stream inlet conduit. The sparger contains three rows of slotted openings distributed across the bottom of the sparger for liquid and vapor distribution over the entire bottom of the grid plate. The slotted openings in the sparger are pointed downward to avoid liquid impingement against the bottom of the reactor grid plate. The slots are selectively positioned and proportionately sized for equal distribution of the total flow of the inlet feedstream across the grid plate.

The cup riser means for separating liquid and vapor is connected through the funnel or cup inner wall in the top head of the reactor in open communication with the top of the catalyst slurry bed and receives a mixture of liquid and vapor exiting the top of the bed. The cup riser is a double pipe riser, i.e., an outer and inner pipe or shell-in-shell with a closed top end of the inner pipe. Only the inner shell is receivably in communication with the top of the catalytic slurry bed to receive the mixture of liquid and vapor. The liquid and vapor exit the top of the inner pipe into two spiraling or helical conduit chambers integrated into the riser means and contained in a top part of the annular space of the riser shell-in-shell to cyclonically separate a liquid stream which is flows down onto the liquid recycle collection funnel or cup. The vapor is collected as an overhead stream within the annular space and exits the cup riser through a conduit connected to top of the outer pipe.

The cup riser of the invention provides a very efficient separation of the liquid and vapor and/or solids output from the catalytic slurry bed. Consequently, the pump for the liquid recycle stream experiences little or no cavitation, eliminating pump failure as a cause for process shut-downs.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which:

FIG. 5b illustrates the cross section of the inlet distributor of FIG. 5a.

DETAILED DESCRIPTION OF THE INVENTION

The inventions described herein are preferably intended to be utilized in advancing the art of high pressure catalytic slurry bed reactor vessels employed in the conversion of fossil fuels, particularly coal, heavy petroleum oils and tar sands into light hydrocarbons useful as fuels and chemicals. These vessels also include the known reactors used in the H-Oil process, the LC-Fining process, the H-Coal process, as well as others. As noted herein before, the use of ebullating bed catalysis reactor technology is well known to those skilled in the art and the advantages and disadvantages of the reactor technology is well documented in the art. The inventions presented herein are intended to advance those advantages and overcome those disadvantages. However, it will also be apparent to those skilled in the art that the inventions described herein can have useful applications in chemical apparatuses outside the scope of just ebullating bed reactor vessels and may be useful, individually or in combination, in reactors employed in the petroleum and energy industries such as fixed bed reactors, fluid bed reactors, slurry bed reactors and the like. Indeed, reactors employed in the chemical industry such as polymerization reactors and hydrogenation reactors and the like are candidates that can benefit from the inventions disclosed herein. The scope is wide and all such applications are included within the scope of the disclosed inventions.

Figure 1:
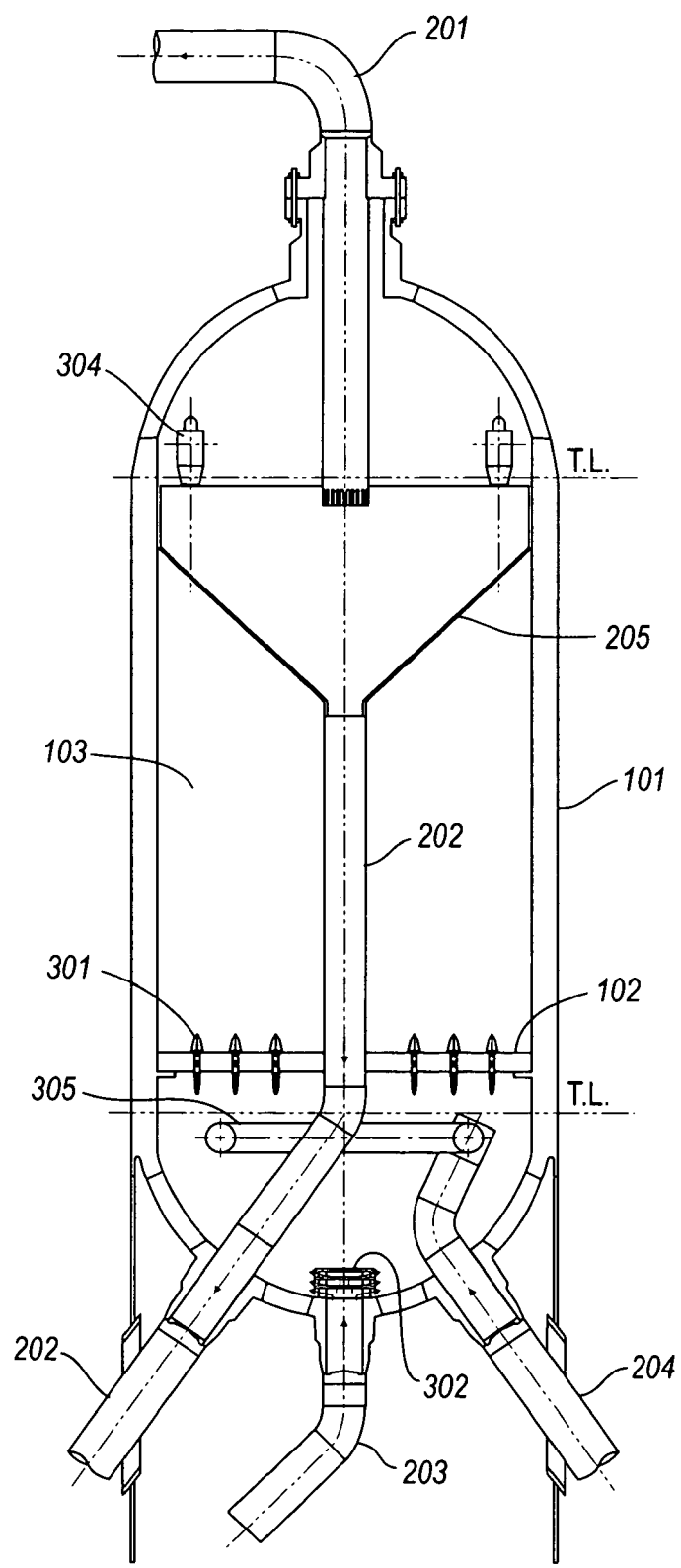
FIG. 1 illustrates the complete reactor vessel of the invention containing the inventions described herein comprising the reactor cup riser, the grid plate bubble cap, inlet spargers and the pump inlet distributor.

Referring to FIG. 1, an apparatus of the instant invention is depicted as an example specifically described as a high pressure, direct coal liquefaction reactor vessel. The reactor shell (101) is a thick walled steel cylinder having a single opening in the reactor top head and three openings in the reactor bottom head. A conduit pipe (201) is attached to the reactor through the top head opening to transport vaporous product from the reactor. Three conduits pipes (202), (203), and (204) are attached to the reactor through the bottom head opening to transport a liquid recycle return stream (202 and 203) into the bottom head of the reactor and a feed stream (204) comprising hydrogen gas plus a slurry of coal fines in oil or, optionally, a heavy oil such as residuum or tar sand product oil. Where the reactor is a dispersed catalytic reactor, the catalyst particles are merged with the feedstream. The recycle flow conduit (202) is connected to the recycle flow return conduit (203) through a recycle return pump not shown. An essentially round, perforated grid plate (102) is circumferentially connected to the reactor inner wall. The grid plate is designed to support preferably an ebullating bed or slurry bed or a fixed bed of solid catalyst particles contained in the reactor void (103). The grid plate contains bubble caps (301) of the invention connected through the grid plate perforations to receive the feedstream and form an abundance of very small hydrogen gas feedstream bubbles to pass into the catalyst bed.

Positioned immediately below the grid plate is a sparger means (305) of the invention receivably connected to the feedstream conduit (204). The sparger comprises one conduit pipe ring having slotted openings in the bottom of the pipe ring positionally directed so that the feedstream will be evenly distributed downward from the sparger throughout the cross-sectional area of the vessel and thereby flow as an even distribution into the grid plate bubble caps (301) in common with the pumped recycle flow return stream from conduit pipe (203).

To facilitate mixing of the recycle flow return and the primary feedstream in the bottom head of the reactor the terminus of conduit (203) in the reactor bottom contains an inlet distributor means (302) designed, as described herein after, to eject the recycle flow return continuously into the bottom of the reactor in a horizontal direction progressively tangential to the circumference of the conduit (203) at its terminus. By this means, a whirlpool effect is established in the liquid in the reactor bottom that re-suspends those fine coal or catalyst particles which have settled in the reactor bottom head and homogenates the recycle and feed stream combination flowing upward.

Conduit recycle flow pipe (202) traverses internally and vertically through the reactor and catalyst bed and is receivably connected to the small outlet mouth of conical liquid collection funnel (205) which is in contact with the inner wall of the reactor. A series of reactor cup risers (304) are connected through the conical wall of the funnel in communication with the liquid/vapor layers above the catalyst bed. The reactor cup riser receives the liquid/vapor streams over the catalyst bed and separates the vapor and liquid components. Vapor lean liquid is collected by the conical funnel for transportation to the recycle pump and vapor passes from the vessel through conduit (201) for further separation into vapor and liquid hydrocarbon products.

Figure 2A:
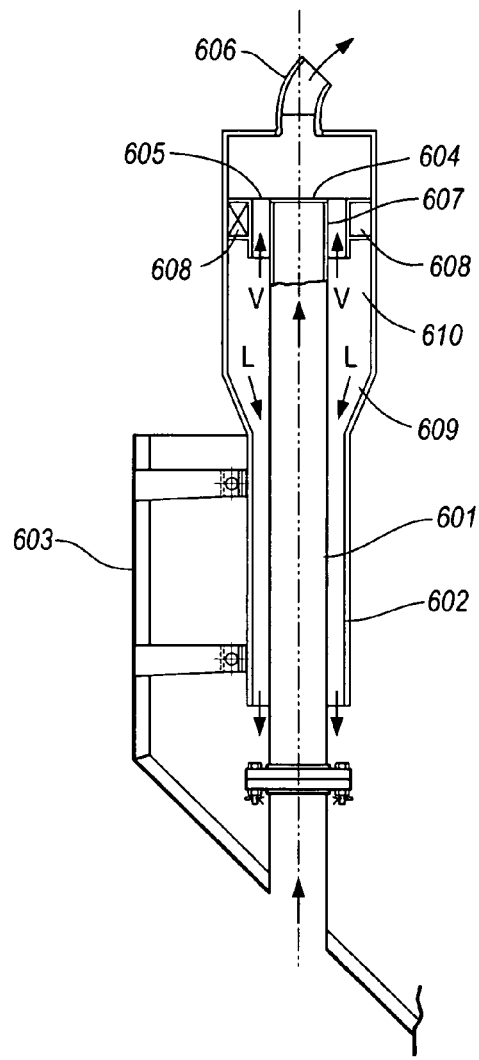
FIG. 2a illustrates the invention comprising the reactor cup riser employed in the reactor vessel of the invention.

Referring to FIG. 2a, the invention comprising the reactor cup riser employed in the reactor vessel of the invention is illustrated containing an integrated cyclonic helical separator conduit for receiving and cyclonically separating a liquid and vapor product stream. The reactor cup riser contains a shell-in-shell inner pipe (601) with a closed end (604). The top of outer pipe (602) is in open communication (605) with the vapor outlet conduit (606). The bottom of the outer pipe (602) is in open communication with the liquid in the cup or funnel. The inner shell is receivably in communication with the top of the catalyst bed to receive the mixture of liquid, vapor and carry-over of coal and/or catalyst particles through the reactor cup or funnel (603). Liquid and vapor rising in the inner pipe exit the top of the inner pipe through slots (607) into two spiraling conduit chambers (608) contained in a top part of the annular space between the shell-in-shell to cyclonically separate liquid and vapor. The separated liquid stream flows down the annular space onto the liquid recycle collection funnel (603). The separated vapor (610) flows as an overhead stream within the annular space (605) and exits the cup riser through the conduit (606) connected to top of the outer pipe. The separated liquid (609) is passed onto the liquid recycle collection funnel.

Figure 2B:
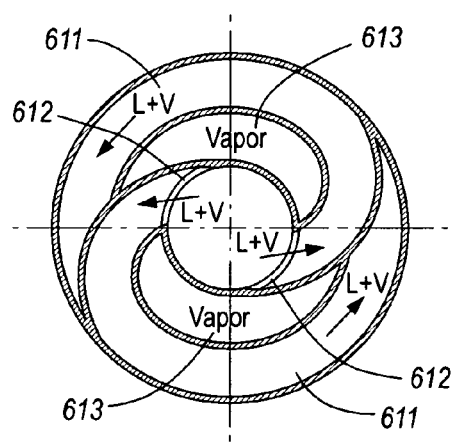
FIG. 2b is a cross-sectional view of the spiral liquid/vapor separator in the reactor cup riser.

In FIG. 2b, a cross-sectional view of the separator comprising two spiraling cyclonic chambers, (designated (608) in FIG. 2a), is presented (611) to show the fluid entrance and exit openings (612) and (613) in the chamber.

Figure 3A:
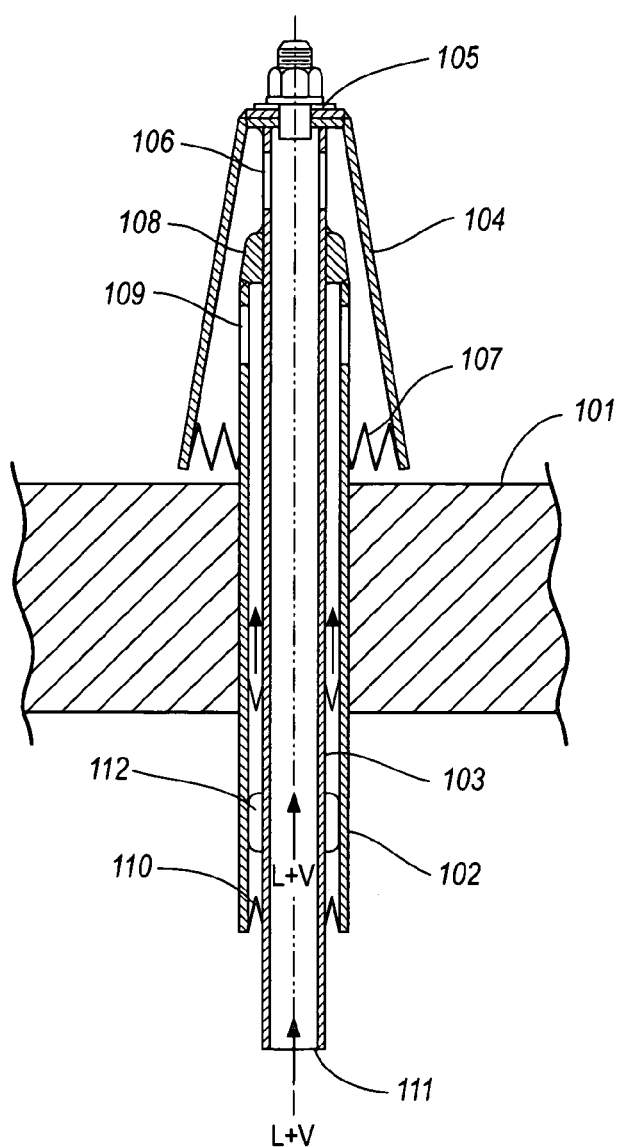
FIG. 3a illustrates the invention comprising the grid plate bubble cap employed in the reactor vessel of the invention.

Referring to FIG. 3a, the invention comprising the grid plate bubble cap employed in the reactor vessel of the invention is illustrated inserted through the grid plate (101). The bubble cap means that is positioned on the grid plate through perforations therein consists of a double pipe riser, i.e., an outer pipe (102) and inner pipe (103), supporting a top bell cap part (104) with the top (105) of the inner pipe. The inner pipe contains four slotted openings (106) in the top wall of the pipe in communication with the interior space of the bubble cap part (104). The bell cap part (104) is a tapered, generally round or cylindrical bell cap of trapezoidal vertical cross-section. The bell cap part (104) bottom section is open with the lower circumferential edge or open bottom edge (107) of the bell cap part notched or serrated into saw-tooth triangles. The outer pipe (102) is closed at the top (108) below the inner pipe slot openings and also contains four slotted openings (109) at the top end of the pipe, which openings are also in communication with the interior space of the bell cap part (104). The bottom edge of the outside pipe is also serrated and terminates (110) in communication with the vapor space-immediately below the grid plate at the liquid and vapor interface. The bottom edge of the inside pipe submerges (111) under the liquid level below the grid plate. Accordingly, vapor flows upward through the annulus space between the inner and outer pipes while vapor saturated liquid flows upward through the inner pipe. Four spacers (112) are located at the bottom between the inner and outer pipes.

The grid plate bubble cap of the invention with the triangular or serrated bell cup edges produces an increased amount of small hydrogen bubbles compared to the prior art. This results in a greater hydrogen surface area and better mass transfer. In addition, the bubble cap of the invention eliminates the vibration and pulsation experienced in the vessel art heretofore. The change in vapor pressure in the outer pipe is equal to the change in pressure of the inner pipe so there is no pulsation caused by vapor/liquid surges resulting from differences in vapor and liquid pressures.

Figure 3B:
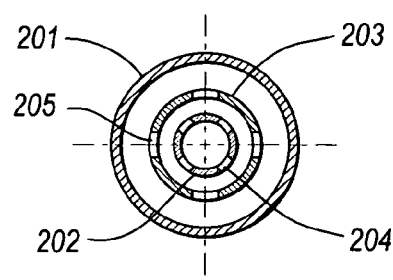
FIG. 3b illustrates the cross section of the tapered bell and inner and outer pipes.

Referring to FIG. 3b, a cross-sectional view of the bubble cap of the invention is presented showing the relationship between the parts of the bell cap (201), the inner pipe (202), the outer pipe (203) and the slots (204) and (205).

Figure 4A:
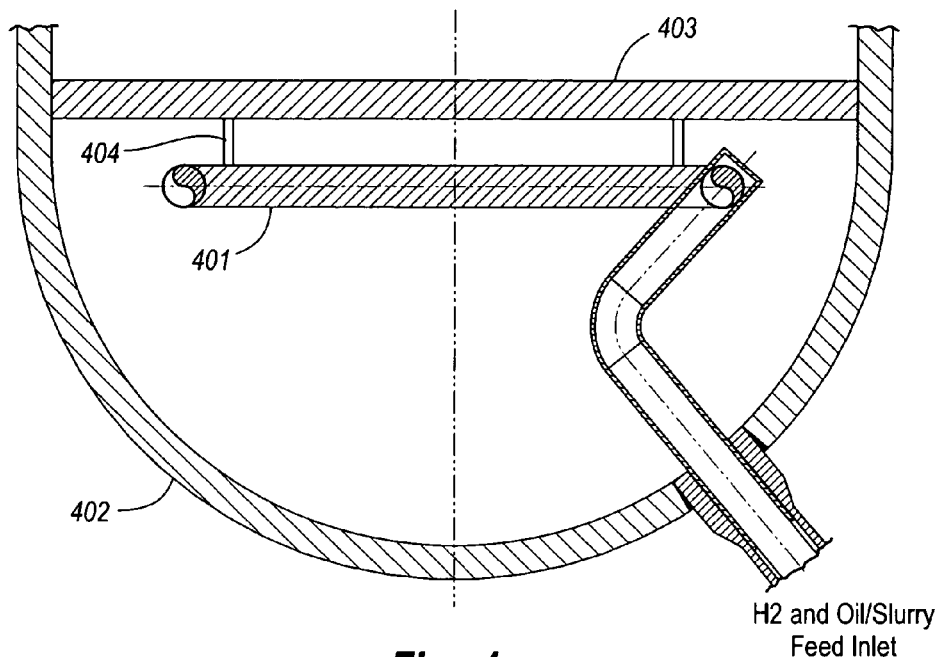
FIGS. 4a and 4b illustrate different views of the invention comprising a single inlet ring sparger employed in the reactor vessel of the invention.
Figure 4B:
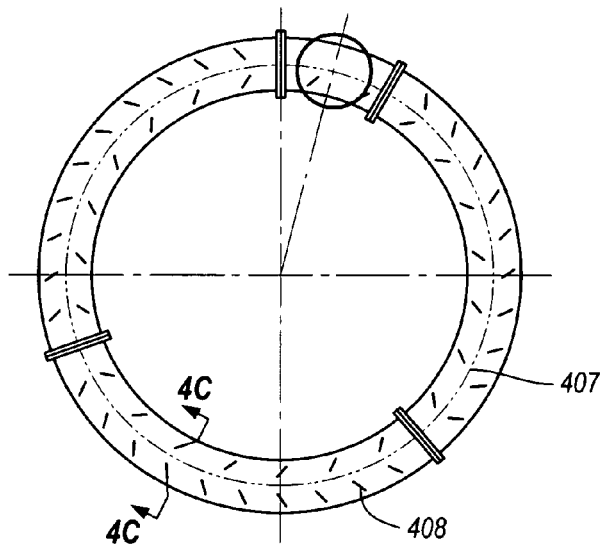
Figure 4C:
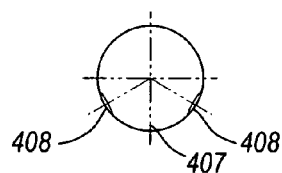
FIG. 4c illustrates the cross section of the inlet ring sparger of FIGS. 4a and 4b.

Referring to FIGS. 4a-4c, the invention comprising a single inlet ring sparger employed in the reactor vessel of the invention is illustrated. The sparger (401) is located in the reactor bottom head (402) below the grid plate (403) and supportively attached thereto (404) (FIG. 4a). The sparger ring is receivably connected to the feedstream conduit. Three rows of slotted openings, one in the bottom center (407) and one of each in each quadrant of the bottom circle on the ring (408) (FIGS. 4b and 4c), are placed in the bottom of the pipe ring sized to provide an even distribution of the feedstream flow from the spargers (401) across the bottom of grid plate (403). The sparger of the invention provides an even distribution of the feedstream across the reactor vessel and reduces the propensity to entrap vapor, thereby eliminating feed stream surging and pulsation.

Figure 5A:
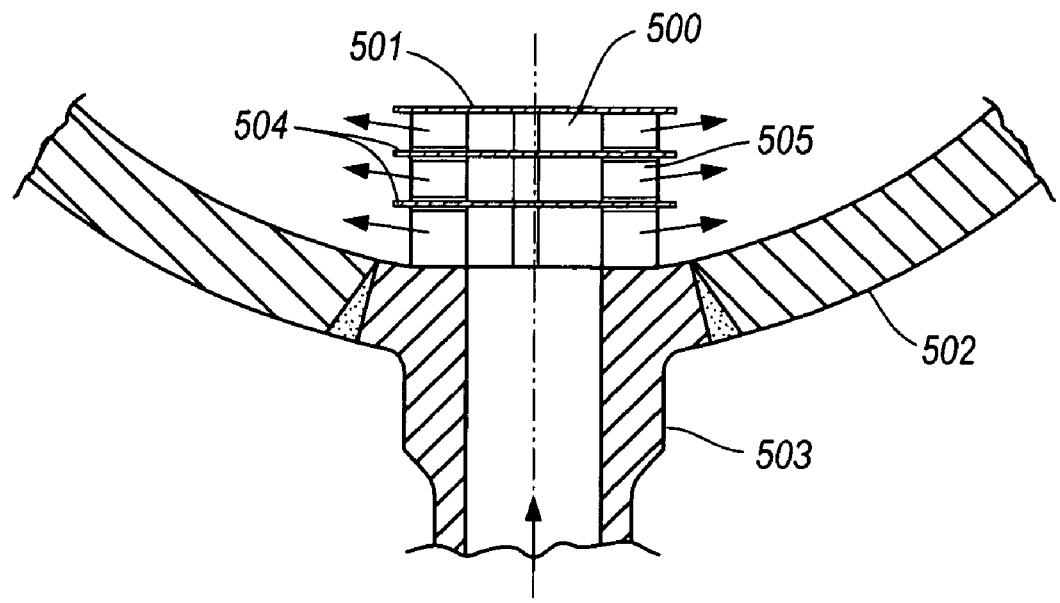
FIG. 5a illustrates the invention comprising the circulating pump return inlet distributor employed in the reactor vessel of the invention.
Figure 5B:
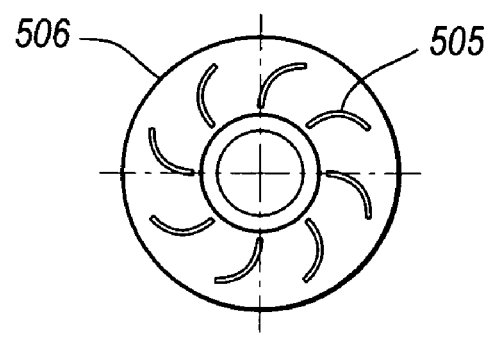

Referring to FIG. 5a, the invention comprising the circulating pump liquid return inlet distributor employed in the reactor vessel of the invention is illustrated. The reactor circulating pump liquid inlet distributor (500) is located within the bottom head (502) of the reactor vessel and connected to the terminus of the liquid recycle conduit (503). A plate (501) caps the top of the inlet distributor (503) providing a closed end distributor requiring a horizontal flow for liquids exiting the inlet distributor. Parallel, horizontal, separated circular plate rings (504), are connected to the distributor having an outer ring circumference and an inner circumference which defines an open passage way (505) for admission of pumped recycle liquid. Vertically curved fins or plates, depicted in FIG. 5b as (505), are positioned between the horizontal plates (506 of FIG. 5b) and between the outer and inner circumferential edge of the horizontal plates together define an opening or exit window between the horizontal plates (506) for passage of the liquid recycle stream into the reactor.

The curved fins of the inlet distributor induce a whirlpool mixing effect in the liquid recycle stream entering the bottom of the reactor which improves the mixing of the recycle stream and the primary feedstream. The whirlpool effect also results in the re-suspension of any solids or fine coal particles that may have settled to the bottom of the reactor after separation from the primary feedstream coal/oil slurry.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A liquid recycle inlet stream distributor assembly for introducing a liquid recycle stream through a bottom of a reactor vessel and also mixing the liquid recycle stream with a primary feedstream introduced into the reactor vessel above the distributor assembly by a feedstream inlet sparger, the inlet stream distributor assembly comprising:

an inlet conduit connected to a liquid recycle stream conduit and disposed through a bottom of a reactor vessel for introducing a liquid recycle stream from the liquid recycle stream conduit through the bottom of the reactor vessel;

an open plate or ring attached to or disposed above said inlet conduit and including a substantially flat body bounded by an exterior edge and an interior edge, and an interior opening therethrough bounded by said interior edge, a closed plate disposed above said plate or ring for diverting the liquid recycle stream from said inlet conduit laterally into the reactor vessel through exit openings above and below said plate or ring; and curved fins laterally disposed on upper and lower sides of said open plate or ring at spaced apart intervals so as to at least partially redirect flow of the liquid recycle stream through said exit openings.

2. A liquid recycle inlet stream distributor assembly as defined in claim 1, said curved fins creating a whirlpool mixing effect in order to improve mixing of the liquid recycle stream with a primary feedstream introduced into the reactor by a feedstream inlet sparger positioned above the liquid recycle inlet stream distributor assembly.

3. A liquid recycle inlet stream distributor assembly as defined in claim 1, said whirlpool mixing effect also causing re-suspension of solids or fine particles that may have settled to the bottom of the reactor vessel.

4. A liquid recycle inlet stream distributor assembly as defined in claim 1, said inlet conduit being positioned substantially vertically through the bottom of the reactor vessel.

5. A liquid recycle inlet stream distributor assembly as defined in claim 1, said open plate or ring being positioned substantially horizontally.

6. A liquid recycle inlet stream distributor assembly as defined in claim 5, said closed plate being substantially parallel to said open plate or ring.

7. A liquid recycle inlet stream distributor assembly as defined in claim 1, said open plate or ring being substantially planar.

8. A liquid recycle inlet stream distributor assembly as defined in claim 1, said open plate or ring being substantially circular.

9. A liquid recycle inlet stream distributor assembly as defined in claim 1, further comprising an additional open plate or ring spaced apart from and positioned above or below said plate or ring and including curved fins laterally disposed on upper and lower sides of said additional open plate or ring.

10. A liquid recycle inlet stream distributor assembly as defined in claim 1, the distributor assembly including three spaced apart plates or rings:

a lower plate or ring spaced apart from the bottom of the reactor vessel and including curved fins laterally disposed between said lower plate or ring and the bottom of the reactor vessel;

an upper plate or ring spaced apart from said closed plate and including curved fins laterally disposed between said upper plate or ring and said closed plate; and a middle plate or ring spaced apart from and positioned between said lower and upper plates or rings and including upper curved fins laterally disposed between said middle plate or ring and said upper plate or ring and lower curved fins laterally disposed between said middle plate or ring and said lower plate or ring.

11. A liquid recycle inlet stream distributor assembly as defined in claim 10, wherein said three plates or rings are substantially horizontal and parallel to each other.

12. A liquid recycle inlet stream distributor assembly as defined in claim 10, wherein each of said three plates or rings includes an interior opening of substantially the same size.

13. A liquid recycle inlet stream distributor assembly as defined in claim 1, the inlet stream distributor assembly including only stationary components such that it does not include any moving parts.

14. A liquid recycle inlet stream distributor assembly for introducing a liquid recycle stream into a reactor vessel and also mixing the liquid recycle stream with a primary feedstream, the inlet stream distributor assembly comprising:

an inlet conduit connected to a liquid recycle stream conduit for introducing a liquid recycle stream from the liquid recycle stream conduit into the reactor vessel;

an open plate or ring attached to or disposed above said inlet conduit and including a substantially flat body bounded by an exterior edge and an interior edge, and an interior opening therethrough bounded by said interior edge, a closed plate disposed above said plate or ring for diverting the liquid recycle stream from said inlet conduit laterally into the reactor vessel through exit openings above and below said plate or ring; and fins laterally disposed on upper and lower sides of said open plate or ring at spaced apart intervals so as to at least partially redirect flow of the liquid recycle stream through said exit openings, the inlet stream distributor assembly including only stationary components such that it does not include any moving parts.

15. A liquid recycle inlet stream distributor assembly as defined in claim 14, wherein said inlet conduit is disposed through a bottom of the reactor vessel for introducing a liquid recycle stream from the liquid recycle stream conduit through the bottom of the reactor vessel.

16. A liquid recycle inlet stream distributor assembly as defined in claim 14, the distributor assembly including two spaced apart plates or rings:

a lower plate or ring spaced apart from the bottom of the reactor vessel and including curved fins laterally disposed between said lower plate or ring and the bottom of the reactor vessel; and an upper plate or ring spaced apart from said closed plate and including curved fins laterally disposed between said upper plate or ring and said closed plate.

17. A liquid recycle inlet stream distributor assembly as defined in claim 14, wherein said fins are curved.

18. A liquid recycle inlet stream distributor assembly for introducing a liquid recycle stream into a reactor vessel and also mixing the liquid recycle stream with a primary feedstream, the inlet stream distributor assembly comprising:

an inlet conduit connected to a liquid recycle stream conduit for introducing a liquid recycle stream from the liquid recycle stream conduit into the reactor vessel;

a plurality of spaced apart open plates or rings attached to or disposed above said inlet conduit, each including a substantially flat body bounded by an exterior edge and an interior edge, and an interior opening therethrough bounded by said interior edge, wherein each plate or ring includes an interior opening of substantially the same size;

a closed plate disposed above said plate or ring for diverting the liquid recycle stream from said inlet conduit laterally into the reactor vessel through exit openings above and below each plate or ring; and fins laterally disposed on upper and lower sides of each open plate or ring at spaced apart intervals so as to at least partially redirect flow of the liquid recycle stream through said exit openings.

19. A liquid recycle inlet stream distributor assembly as defined in claim 18, the distributor assembly including three spaced apart plates or rings:

a lower plate or ring spaced apart from the bottom of the reactor vessel and including curved fins laterally disposed between said lower plate or ring and the bottom of the reactor vessel;

an upper plate or ring spaced apart from said closed plate and including curved fins laterally disposed between said upper plate or ring and said closed plate; and a middle plate or ring spaced apart from and positioned between said lower and upper plates or rings and including upper curved fins laterally disposed between said middle plate or ring and said upper plate or ring and lower curved fins laterally disposed between said middle plate or ring and said lower plate or ring.

20. A liquid recycle inlet stream distributor assembly as defined in claim 18, wherein said fins are curved.

* * * * *

UNITED STATES PATENT AND TRADEMARK OFFICE
CERTIFICATE OF CORRECTION

PATENT NO. : 7,350,962 B2  Page 1 of 1
APPLICATION NO. : 11/044690
DATED : April 1, 2008
INVENTOR(S) : Kao et al.

It is certified that error appears in the above-identified patent and that said Letters Patent is hereby corrected as shown below:

Column 1
Line 24, change "hydrocrackng" to --hydrocracking--

Column 2
Line 61, change "dedication" to --dedicated--

Column 3
Line 43, change "recycle is" to --recycle stream is--

Column 4
Line 3, change "recycle liquid" to --recycled liquid--
Line 66, change "which is flows down onto" to --which flows down into--

Column 5
Line 2, change "to top" to --to the top--

Column 7
Line 24, change "to top" to --to the top--
Line 25, change "onto" to --into--
Line 39, change "bubble cap" to --bell cap--

Signed and Sealed this

Seventh Day of October, 2008

JON W. DUDAS
*Director of the United States Patent and Trademark Office*